(12) United States Patent
Berels

(10) Patent No.: US 10,486,664 B2
(45) Date of Patent: Nov. 26, 2019

(54) TRACTION AND STABILITY CONTROL SYSTEM

(71) Applicant: Ford Global Technologies, LLC, Dearborn, MI (US)

(72) Inventor: David Jeffeory Berels, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 145 days.

(21) Appl. No.: 15/609,982

(22) Filed: May 31, 2017

(65) Prior Publication Data

US 2018/0345924 A1 Dec. 6, 2018

(51) Int. Cl.
*B60T 8/175* (2006.01)
*B60T 8/172* (2006.01)
*B60T 8/72* (2006.01)
*B60K 35/00* (2006.01)

(52) U.S. Cl.
CPC .............. *B60T 8/175* (2013.01); *B60T 8/172* (2013.01); *B60T 8/72* (2013.01); *B60K 2370/16* (2019.05); *B60K 2370/46* (2019.05); *B60K 2370/774* (2019.05); *B60T 2210/36* (2013.01); *B60T 2260/04* (2013.01); *B60T 2270/206* (2013.01)

(58) Field of Classification Search
CPC . B60T 8/175; B60T 8/72; B60T 8/172; B60T 2270/206; B60T 2210/36; B60K 35/00; B60K 2350/307; B60K 2350/925; B60K 2350/1076
See application file for complete search history.

(56) References Cited

U.S. PATENT DOCUMENTS

| 4,771,850 | A | 9/1988 | Matsuda |
| 7,107,138 | B2 | 9/2006 | Currie |
| 8,380,417 | B2 | 2/2013 | Kaster |
| 9,037,341 | B2 * | 5/2015 | James ................ B60W 50/14 701/34.4 |
| 9,145,167 | B2 | 9/2015 | Onaya et al. |

(Continued)

FOREIGN PATENT DOCUMENTS

| DE | 102004017422 A1 | 10/2005 |
| DE | 102010028486 A1 | 11/2011 |
| DE | 102014209303 A1 | 11/2015 |

(Continued)

OTHER PUBLICATIONS

Search Report dated Oct. 31, 2018 for GB Patent Application No. GB 1808825.2 (5 pages).

(Continued)

*Primary Examiner* — Nga X Nguyen
(74) *Attorney, Agent, or Firm* — Frank Lollo; Eversheds Sutherland (US) LLP

(57) ABSTRACT

Method and apparatus are disclosed for a traction and stability control system. An example vehicle includes wheel speed sensors on wheels of the vehicle and a traction control module. The example traction control module determines, based on measurements of the wheel speed sensors or a transmission control module, whether the vehicle is likely stuck. Additionally, when the vehicle is likely stuck and an indication to disable the a traction control system has been received, the example traction control module disables the traction control system.

13 Claims, 6 Drawing Sheets

(56) References Cited

U.S. PATENT DOCUMENTS

2013/0325255 A1  12/2013  James et al.
2015/0073674 A1  3/2015  Kelly et al.

FOREIGN PATENT DOCUMENTS

EP          1625041 A1     2/2006
EP          1625041 B1     3/2008
WO    WO 2013056723 A1    4/2013

OTHER PUBLICATIONS

Mark Petovello, *How does a GNSS receiver estimate velocity?*, Mar./Apr. 2015 (pp. 38-41).

\* cited by examiner

TRACTION AND STABILITY CONTROL SYSTEM

TECHNICAL FIELD

The present disclosure generally relates to a vehicle motive control systems and, more specifically, a traction and stability control system.

BACKGROUND

A stability and traction control system detects a loss of traction on driving wheel. This is often caused by engine torque and throttle input being mismatched to road condition. The stability and traction control system applies brakes to that wheel so it is not spinning faster than the other wheels. In some scenarios, the stability and traction control system inhibits the vehicle's ability to spin its tires in situations where spinning the tires might be useful. For example, this inhibition does not allow the driver to maximize his chance of getting the vehicle unstuck. Thus, when the vehicle is stuck in the snow at the bottom of the hill, the traction control system limits the torque to the wheels to prevent them from spinning. This typically results in the vehicle not moving or getting up the grade. This is a problem because most drivers do not realize that a normally beneficial system can hinder their ability to get unstuck. Additionally, most drivers do not know how to enable and disable the stability and traction control system.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a traction and stability control system. An example vehicle includes wheel speed sensors on wheels of the vehicle and a traction control module. The example traction control module determines, based on measurements of the wheel speed sensors or a transmission control module, whether the vehicle is likely stuck. Additionally, when the vehicle is likely stuck and an indication to disable the a traction control system has been received, the example traction control module disables the traction control system An example method to control a traction control system in a vehicle includes determining, based on measurements of wheel speed sensors or a transmission control module, whether the vehicle is likely stuck without input from an occupant of the vehicle. Additionally, the example method includes when the vehicle is likely stuck and an indication to disable the traction control system has been received, disabling, via a traction control module, the traction control system.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
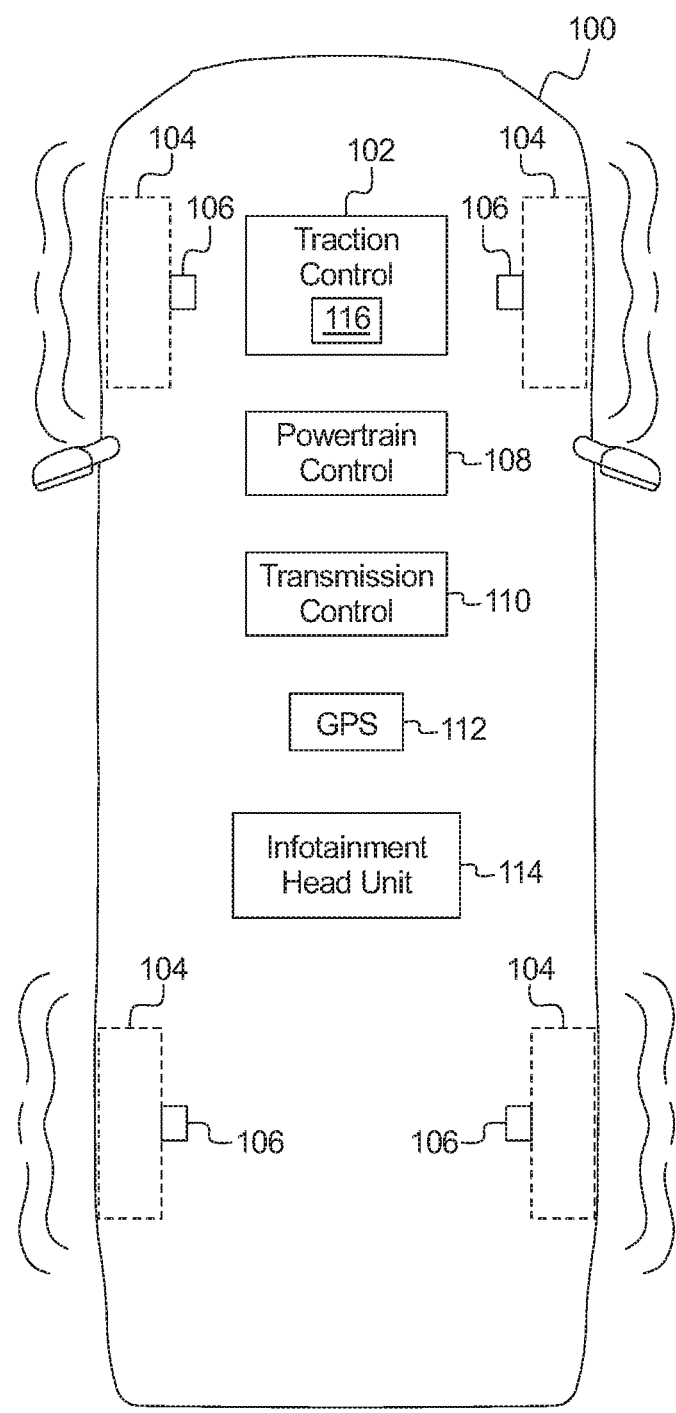
FIG. 1 illustrates a vehicle with a traction control module operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Different weather and/or road surface conditions can cause a vehicle to become stuck unable to move. For example, a driver maybe driving a vehicle and get stuck in a snow drift. In such an example, when the driver presses the accelerator pedal and the tires start to spin, the traction control system limits the torque to one or more of the wheels to prevent the wheel(s) from spinning. When the driver shifts to reverse, the same series of events occur. As disclosed below, the traction control module recognizes when the vehicle may be stuck by monitoring traction control events, wheel speed, vehicle position (e.g. obtained via a global positioning system (GPS) receiver), a vehicle speed, and/or changes in gear shift position, etc. In some examples, upon detecting that the vehicle is likely stuck, the traction control module provides steps to disable the traction control system. Alternatively, in some examples, upon detecting that the vehicle is likely stuck, the traction control module automatically disables the traction control system. Additionally, when the traction control module detects that the vehicle is no longer stuck, the traction control module either automatically enables the traction control system or provides steps for the driver to manually enable the traction control system.

FIG. 1 illustrates a vehicle 100 with a traction control module 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a power train with an engine, a transmission, a suspension, and/or a driveshaft, etc. The vehicle 100 includes wheels 104. The wheels 104 may be drive wheels or non-drive wheels. The power train of the vehicle 100 delivers torque to the drive wheels that causes traction to propel the vehicle 100. If a vehicle 100 is a two-wheel (2 W) drive vehicle, two of the wheels 104 are drive wheels (e.g., the front wheels 104 for front-wheel drive (FWD) vehicles, the rear wheels 104 for rear-wheel drive (RWD) vehicles). If the vehicle 100 is a four-wheel (4 W) drive vehicle, all four wheels 104 are drive wheels. Some vehicles 100 (such as sport utility vehicles) are configured to switch between a 2 W drive mode and a 4 W drive mode. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes the traction control module 102, wheel speed sensors 106, a power train control module 108, a transmission control module 110, a global positioning system (GPS) receiver 112, and an infotainment head unit 114.

The wheel speed sensors 106 are mounted on at least the drive wheels 104 of the vehicle 100. For example, when a vehicle 100 is a 4 W drive vehicle or has a 4WD mode, the wheel speed sensors 106 are mounted on all four wheels 104. The wheel speed sensors 106 measure the rotation of the associated wheels 104. The traction control module 102 uses the wheel speed sensors 106 to determine which wheels 104 have lost tractions.

The power train control module 108 includes hardware and firmware to control the ignition, fuel injection, emission systems, transmission and/or the brake system of the vehicle 100. The power train control module 108 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system.

The transmission control module 110 includes hardware and firmware to control (e.g., via electrical solenoids, pressure control solenoids, etc.) and report the state of a transmission of the vehicle 100. The transmission control module 110 uses sensors (e.g., vehicle speed sensors, wheel speed sensors 106, throttle position sensors, drive shaft torque sensors, engine sensors, automatic transmission sensors, etc.) to determine when to shift the transmission to, for example, increase fuel efficiency and/or vehicle handling. In some examples, the transmission control module 110 is incorporated into the power train control module 108.

The GPS receiver 112 provides the coordinates of the vehicle 100. While the term "GPS receiver" is used here, the GPS receiver 112 may be compatible with any global navigation satellite system (e.g., GPS, a Global Navigation Satellite System (GLONASS), Galileo Positioning System, BeiDou Navigation Satellite System, etc.). In some examples, the GPS receiver 112 may also provide a speed of the vehicle 100. For example, when the vehicle 100 is stuck and the wheels 104 are spinning, measurements from the wheel speed sensors 106 cannot be used to determine the speed of the vehicle 100.

The infotainment head unit 114 provides an interface (sometime referred to as a "human-machine interface") between the vehicle 100 and a user. The infotainment head unit 114 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. The infotainment head unit 114 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). The infotainment system provides a human machine interface (HMI) on which the traction control module 102 prompts the user to enable and disable the traction control system. Additionally, the infotainment head unit 114 displays the infotainment system on, for example, the center console display.

The traction control module 102 includes hardware and firmware to detect when one or more wheels 104 lose traction which is indicative of wheel slip. The traction control system of the traction control module 102 uses the wheel speed sensors 106 to determine when a wheel 104 is spinning faster than the other wheels 104. The traction control system instructs the brakes (e.g., via a anti-lock brake module) to apply the corresponding brake in short bursts in rapid succession to reduce the spin of the wheel 104 that lost traction.

In the illustrated example, the traction control module 102 includes a mobility detector 116. The mobility detector 116 determines (a) when the vehicle 100 is likely stuck (e.g., in mud, in snow, etc.) and (b) whether to disable the traction control system of the traction control module 102. To determine when the vehicle 100 is likely stuck, the mobility detector 116 uses (i) measurements from the wheel speed sensors 106, (ii) the speed of the vehicle 100 determined by the GPS receiver 112, (iii) the state of the traction control system (e.g., active, inactive), and/or (iv) shifting patterns of the transmission of the vehicle 100 (e.g., shifting from drive to reverse, etc.), etc. As used here, the terms "enabled" and "disabled" refer to whether the traction control system is monitoring the wheels 104 for loss of traction. As used herein, the terms "active" and "inactive" refer to whether the traction control system is operating to ameliorate the detected loss of traction. In some examples, when the traction control system is active, the mobility detector 116 monitors the speed of the vehicle 100 as determined by the GPS receiver 112. In such examples, when the speed of the vehicle 100 is below a threshold, the mobility detector 116 determines that the vehicle is likely stuck. In some examples, the threshold is five miles per hour (mph) (eight kilometers per hour (kph)). The threshold is set to account for drift in the coordinates of the vehicle 100 as measured by the GPS receiver 112. In such examples, the mobility detector 116 does so because at least one of the wheels 104 lost traction (hence the traction control system is active) and the speed of the vehicle 100 is indicative that the vehicle 100 is not substantially moving (e.g. more than two or three feet, etc.). Alternatively, in some examples, the when the traction control system is active, the mobility detector 116 monitors, via corresponding wheel speed sensors 106, the speed of the non-drive wheels 104. In such examples, the mobility detector 116 also monitors the shifting pattern of the transmission. In such examples, when the speed of the non-drive wheels 104 is below a threshold (e.g., five mph (8 kph), etc.) or the gear selection of the transmission has switched between drive and reverse a threshold number of times (e.g., two, three, etc.), the mobility detector 116 determines that the vehicle 100 is likely stuck. In such examples, the mobility detector 116 does so because the non-drive wheels having a speed below the threshold is indicative of the vehicle 100 not substantially moving, and repeatedly shifted between drive and reverse is indicative of a driver trying to become unstuck.

When the mobility detector 116 determines that the vehicle 100 is likely stuck, the mobility detector 116 determines whether to disable the traction control system. In some examples, after determining that the vehicle 100 is likely stuck, the mobility detector 116 visually and/or audibly prompts the driver about disabling the traction control system. For example, the mobility detector 116 may cause a prompt to appear on a touch screen of a center console display of the infotainment system inquiring whether the driver wants to disable the traction control system. As another example, the mobility detector 116 may, using voice synthesis, ask the driver if the drive wants to disable the traction control system, and, though speech recognition, obtain the driver's answer. In such examples, when the driver indicates to disable the traction control system, the mobility detector 116 disables the traction control system. In such examples, the mobility detector 116 monitors the speed of the vehicle 100 (e.g., as determines by the GPS receiver 112, etc.). When the speed of the vehicle 100 is greater than a first threshold speed (e.g., ten mph (sixteen kph)), the mobility monitor prompts the driver about enabling the traction control system. In such examples, when the driver indicates that the traction control system is to be enabled, the mobility detector 116 enables the traction control system. When the drive does not respond, the mobility detector 116 waits for a period of time (e.g., thirty seconds, etc.). The mobility detector 116 then compares the speed of the vehicle 100 to a second threshold (e.g., twenty mph (thirty-three kph)). When the speed of the vehicle 100 satisfies (e.g., is greater than) the second threshold, the mobility detector 116 enables the traction control system. In such a manner, the traction control system is enabled after the vehicle 100 is no longer stuck.

Alternatively, in some examples, after determining that the vehicle 100 is likely stuck, the mobility detector 116 automatically disabled the traction control system without any further input from the driver. In some such examples, the mobility detector 116 causes an indicator to light up on a dashboard display and/or a message indicating that the traction control system has been disabled. The mobility detector 116 then monitors the speed of the vehicle 100. When the speed of the vehicle 100 is greater than a threshold (e.g., ten mph (sixteen kph), twenty mph (thirty-three kph), etc.), the mobility detector 116 automatically enables the traction control system.

Figure 2:
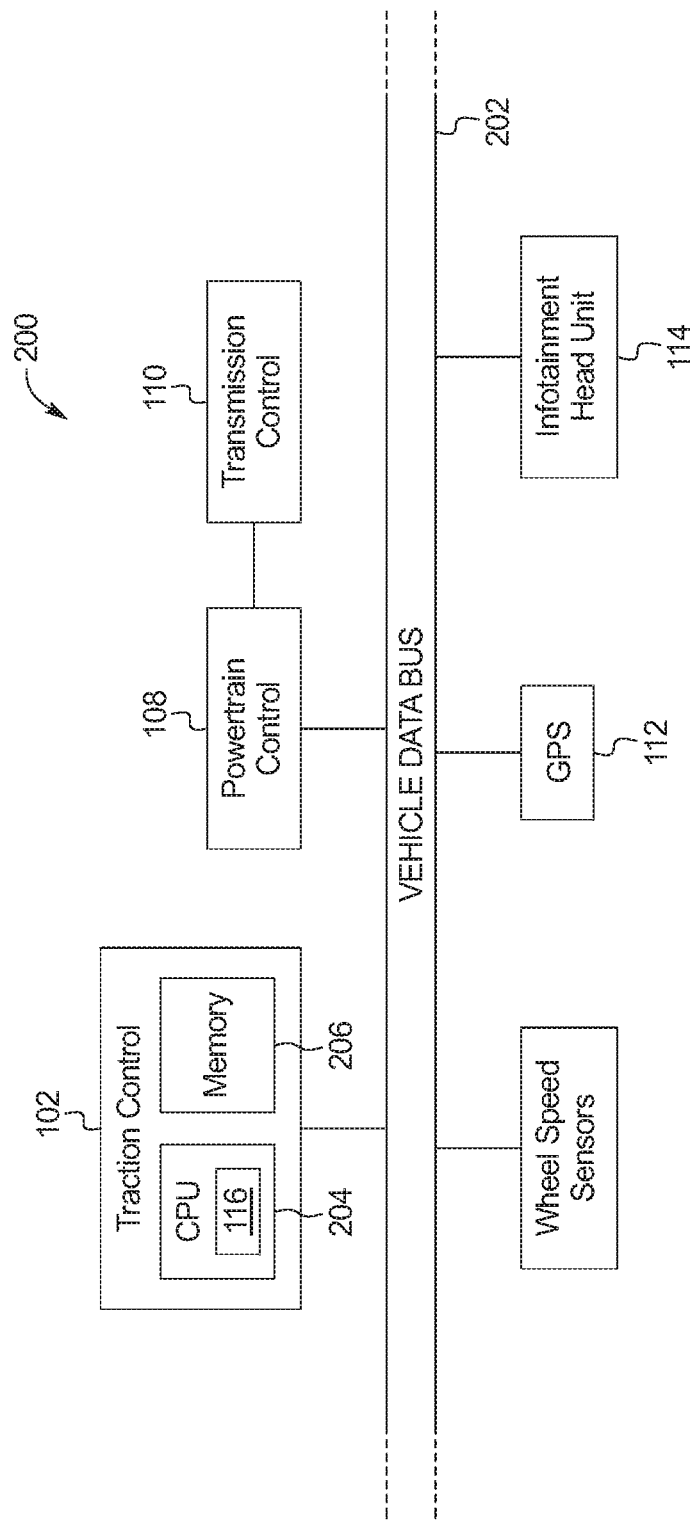
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the traction control module 102, the wheel speed sensors 106, the power train control module 108, the transmission control module 110, the GPS receiver 112, the infotainment head unit 114, and a vehicle data bus 202.

The traction control module 102 includes a processor or controller 204 and memory 206. In the illustrated example, the traction control module 102 is structured to include the mobility detector 116. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the traction control module 102, the wheel speed sensors 106, the power train control module 108, the transmission control module 110, the GPS receiver 112, and/or the infotainment head unit 114. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
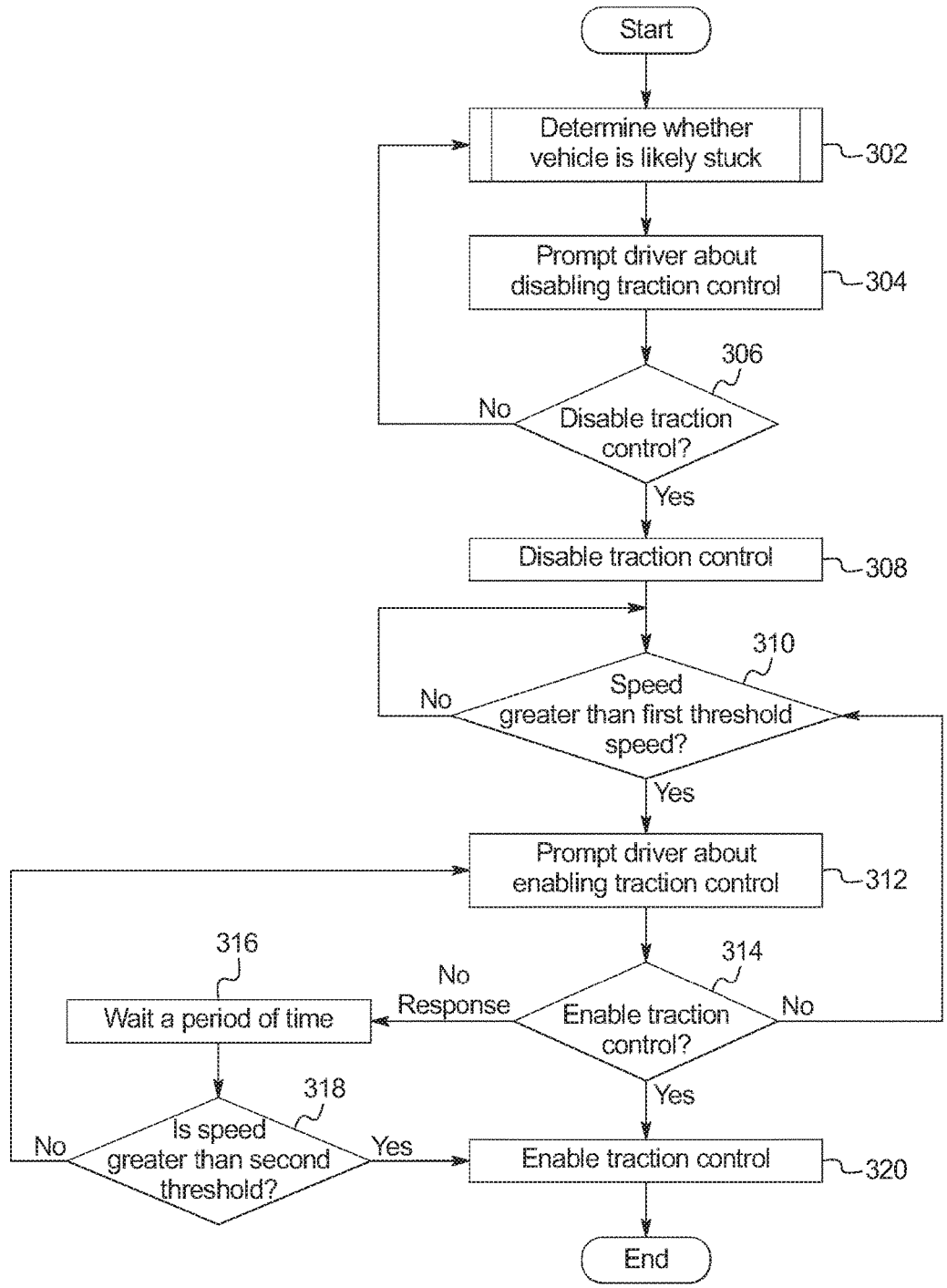
FIGS. 3 and 4 are flowcharts of methods to enable and disable the traction control system, which may be implemented by the electronic components of FIG. 2.

FIG. 3 is a flowchart of a method to enable and disable the traction control system, which may be implemented by the electronic components 200 of FIG. 2. Initially, at block 302, the mobility detector 116 determines whether the vehicle 100 is likely stuck. Example methods to determine whether the vehicle 100 is likely stuck are discussed in FIGS. 5 and 6 below. At block 304, the mobility detector 116 prompts the driver about disabling the traction control system. In some examples, the mobility detector 116 provides the prompt via the infotainment head unit 114. For example, the mobility detector 116 may display a window with "Are you stuck?" In such an example, if the driver presses "yes," the mobility detector 116 may display a window with "Turning off traction control might help get unstuck. Would you like traction control turned off?" At block 306, determines whether to disable the traction control system. If the driver indicates to disable the traction control system, the method continues at block 308. Otherwise, if the driver does not indicate to disable the traction control system, the method returns to block 302. At Block 308, the mobility detector 116 disables the traction control system.

At block 310, the mobility detector 116 waits until the speed of the vehicle 100 as determined by the GPS receiver 112 satisfies (e.g., is greater than) a first speed threshold. At block 312, the mobility detector 116 prompts the driver about enabling the traction control system. For example, the mobility detector 116 may display a window with "You appear to be unstuck. Would you like to turn on the traction control?" At block 314, the mobility detector 116 determines whether to enable the traction control system. When the driver indicates to enable the traction control system, the method continues to block 320. When the driver indicates not to enable the traction control system, the method returns to block 310. Otherwise, when the driver does not response to the prompt, the method continues to block 316.

At block 316, the mobility detector 116 waits for a period of time. In some examples, the mobility detector 116 waits for thirty seconds. At block 318, the mobility detector 116 determines whether the speed of the vehicle 100 satisfies (e.g., is greater than) a second speed threshold (e.g., twenty mph (thirty-three kph), etc.). When the speed of the vehicle 100 satisfies the threshold, the method continues to block 320. Otherwise, when the speed of the vehicle 100 does not satisfy the threshold, the method returns to block 312. At block 320, the mobility detector 116 enables the traction control system.

Figure 4:
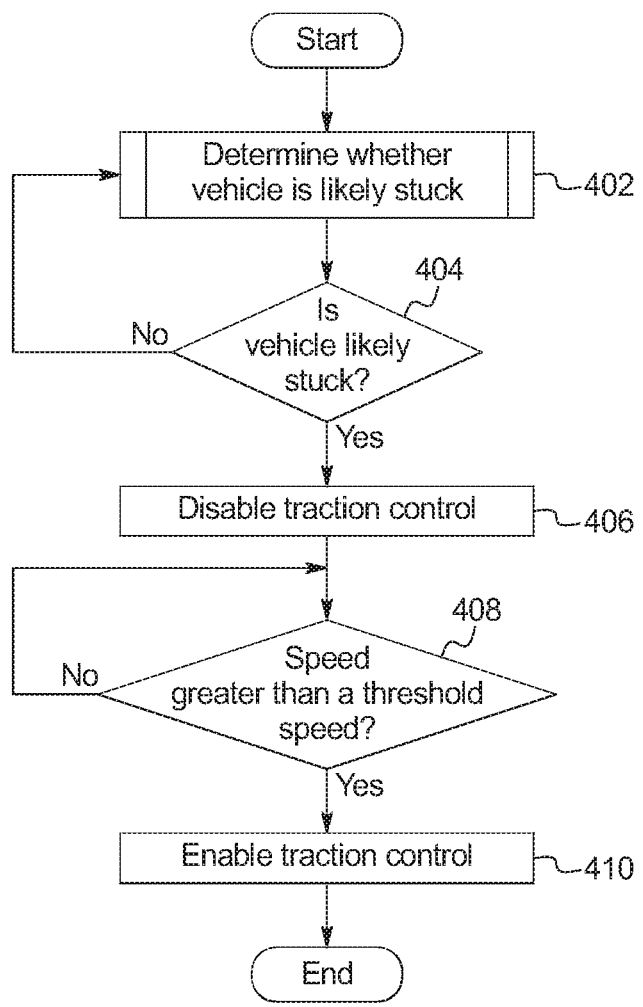

FIG. 4 is a flowchart of a method to enable and disable the traction control system, which may be implemented by the electronic components 200 of FIG. 2. Initially, at block 402, the mobility detector 116 determines whether the vehicle 100 is likely stuck. Example methods to determine whether the vehicle 100 is likely stuck are discussed in FIGS. 5 and 6 below. At block 404, when the mobility detector 116 determines that the vehicle 100 is likely stuck, the method continues to block 406. Otherwise, when the mobility detector 116 determines that the vehicle 100 is not likely stuck, the method returns to block 402. At block 406, the mobility detector 116 automatically disables the traction control system without further input from the driver. At block 408, the mobility detector 116 waits until the speed of the vehicle 100 satisfies (e.g., is greater than) a speed threshold (e.g., ten mph (sixteen mph)). At block 410, when the speed of the vehicle 100 satisfies the speed threshold, the mobility detector 116 automatically enables the traction control system without further input from the driver.

Figure 5:
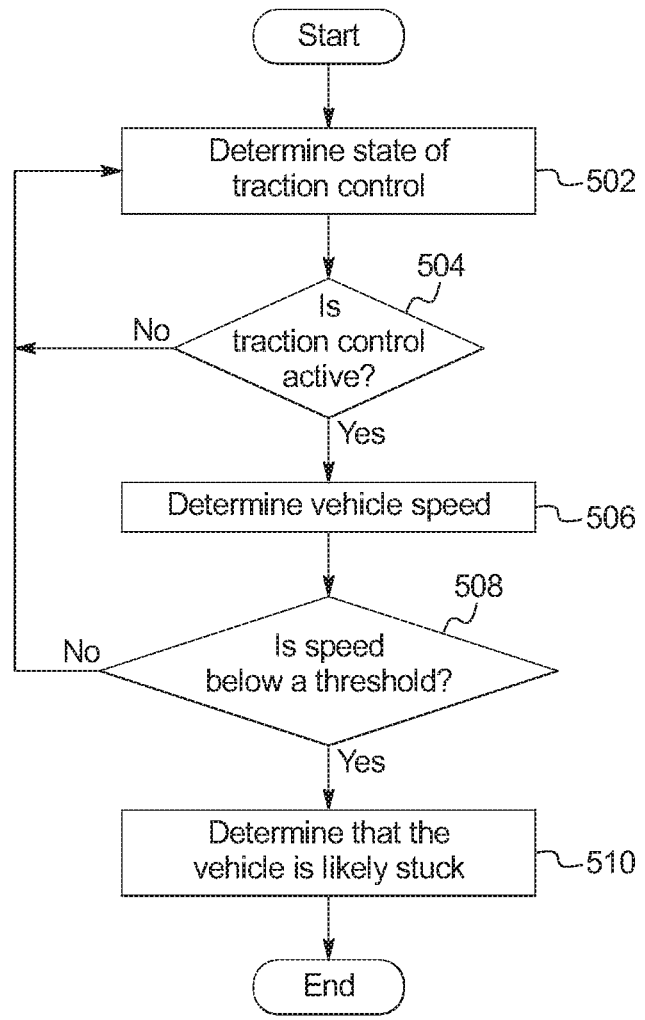
FIGS. 5 and 6 are flowcharts of methods to determine whether the vehicle of FIG. 1 is stuck, which may be implemented by the electronic components of FIG. 2.

FIG. 5 is a flowchart of a method to determine whether the vehicle 100 of FIG. 1 is stuck, which may be implemented by the electronic components 200 of FIG. 2. Initially, at block 503, the mobility detector 116 determines the state (e.g., active or inactive) of the traction control system. At block 504, when the traction control system is active, the method continues to block 506. Otherwise, when the traction control system in inactive, the method returns to block 502. At block 506, the mobility detector 116 determines the speed of the vehicle 100. In some examples, the mobility detector 116 determines the speed of the vehicle 100 by receiving the speed from the GPS receiver 112. At block 508, the mobility detector 116 compares the speed of the vehicle 100 to a threshold (e.g., five mph (eight kph), etc.). When the speed of the vehicle 100 satisfies (e.g., is less than) the threshold, the method continues to block 510. Otherwise, when the speed of the vehicle 100 does not satisfy the threshold, the method returns to block 502. At block 510, the mobility detector 116 determines that the vehicle is likely stuck.

Figure 6:
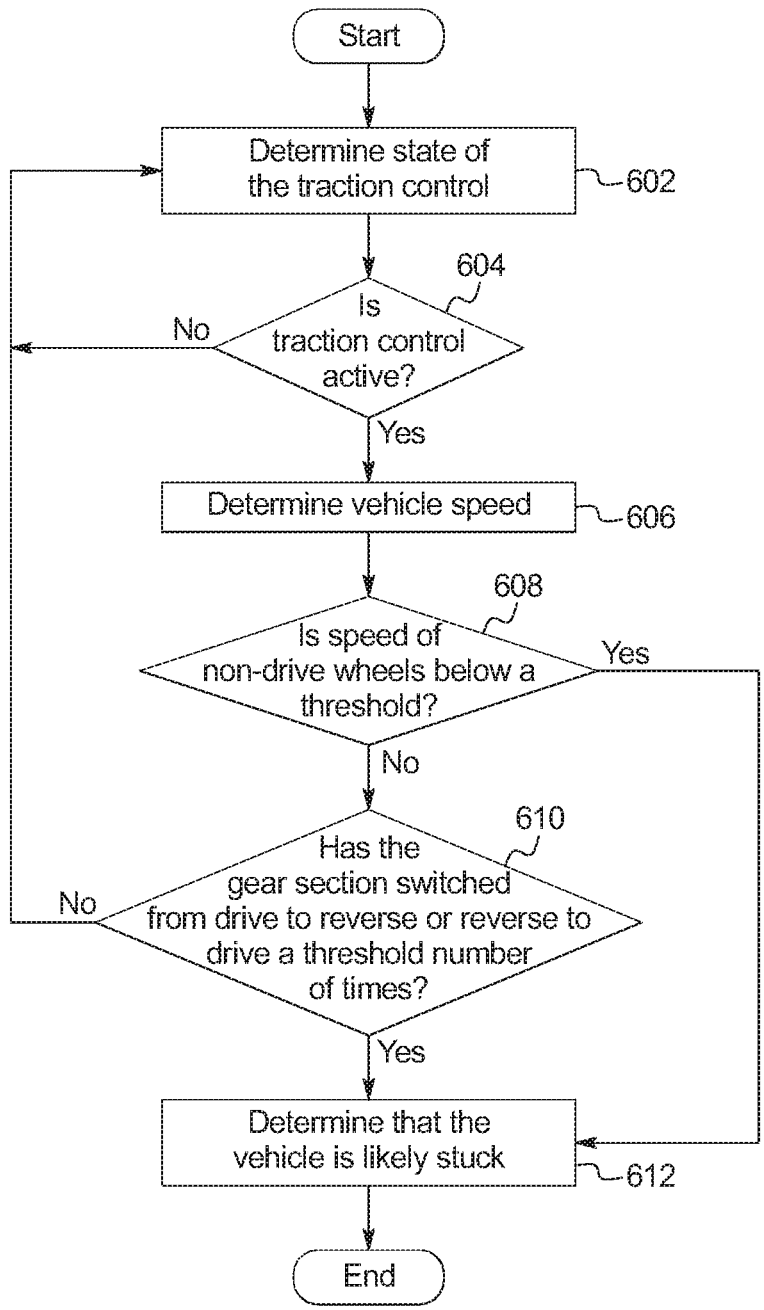

FIG. 6 is a flowchart of a method to determine whether the vehicle 100 of FIG. 1 is stuck, which may be implemented by the electronic components 200 of FIG. 2. Initially, at block 603, the mobility detector 116 determines the state (e.g., active or inactive) of the traction control system. At block 604, when the traction control system is active, the method continues to block 606. Otherwise, when the traction control system in inactive, the method returns to block 602. At block 606, the mobility detector 116 determines the speed of the vehicle 100. In some example, the mobility detector 116 determines the speed of the vehicle 100 based on measurements from the wheel speed sensors 106 on the non-drive wheels 104. At block 608, the mobility detector 116 determines if the speed of the non-drive wheels 104 satisfies (e.g., is less than) a speed threshold (e.g., five mph (eight kph), etc.). When the speed of the non-drive wheels 104 satisfies the threshold, the method continues to block 512. Otherwise, when the speed of the non-drive wheels 104 does not satisfy the threshold, the method continues to block 510. At block 510, the mobility detector 116 examines the pattern of switching of the gear selector between a drive gear and a reverse gear of the transmission. Specifically, the mobility detector 116 determines whether the transmission has been switched from the drive gear to the reverse gear a threshold (e.g., one, two, three, etc.) number of times. When the transmission has been switched from the drive gear to the reverse gear the threshold number of times, the method continues to block 512. Otherwise, when the transmission has not been switched from the drive gear to the reverse gear the threshold number of times, the method returns to block 502.

The flowcharts of FIGS. 3, 4, 5, and 6 are representative of machine readable instructions stored in memory (such as the memory 206 of FIG. 2) that comprise one or more programs that, when executed by a processor (such as the processor 204 of FIG. 2), cause the vehicle 100 to implement the example mobility detector 116 and/or, more generally, the example traction control module 102 of FIGS. 1 and 2. Further, although the example program(s) is/are described with reference to the flowcharts illustrated in FIGS. 3, 4, 5, and 6, many other methods of implementing the example mobility detector 116 and/or, more generally, the example traction control module 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
   first wheel speed sensors on drive wheels of the vehicle;
   second wheel speed sensors on non-drive wheels of the vehicle; and
   a traction control module to:
      activate a traction control system based on measurements of the first wheel speed sensors;
      determine, based on measurements of the second wheel speed sensors, whether the vehicle is stuck; and when the vehicle is stuck and an indication to disable the a traction control system has been received, disable the traction control system.

2. The vehicle of claim 1, wherein to determine whether the vehicle is stuck, the traction control module is to, when the traction control system is active:
   determine a speed of the vehicle using measurements of the second wheel speed sensors, and
   when the speed of the vehicle satisfies a threshold, determine that the vehicle is stuck.

3. The vehicle of claim 1, wherein when the vehicle is stuck, the traction control module is to generate the indication to disable the traction control system without input from an occupant of the vehicle.

4. The vehicle of claim 1, wherein when the vehicle is stuck, the traction control module is to generate the indication to disable the traction control system in response to receiving a confirmation in response to a prompt on a human-machine interface to disable the traction control system.

5. The vehicle of claim 1, wherein the traction control system is to, in response to determining that the vehicle is no longer stuck based on a speed of the vehicle being greater than a threshold, enable the traction control system.

6. The vehicle of claim 1, wherein the traction control system is to enable the traction control system when (a) a indication to enable the traction control system is received in response to a prompt on a human-machine interface to enable the traction control system after the traction control system has been disabled, and (b) after not receiving the indication to enable the traction control system in response to the prompt on the human-machine interface after a period of time, a speed of the vehicle is greater than a threshold.

7. A method to control a traction control system in a vehicle comprising:
   activating the traction control system based on measurements of wheel speed sensors associated with drive wheels of the vehicle;
   determining, based on measurements of wheel speed sensors associated with non-drive wheels of the vehicle, whether the vehicle is stuck without input from an occupant of the vehicle; and
   when the vehicle is stuck and an indication to disable the traction control system has been received, disabling, via a traction control module, the traction control system.

8. The method of claim 7, wherein determining whether the vehicle is stuck includes, when the traction control system is active:
   determining a speed of the vehicle using measurements of the wheel speed sensors associated with the non-drive wheels, and
   when the speed of the vehicle satisfies a threshold, determining that the vehicle is stuck.

9. The method of claim 7, including when the vehicle is stuck, generating the indication to disable the traction control system without input from the occupant of the vehicle.

10. The method of claim 7, including when the vehicle is stuck, generating the indication to disable the traction control system in response to receiving a confirmation in response to a prompt on a human-machine interface to disable the traction control system.

11. The method of claim 7, including, in response to determining that the vehicle is no longer stuck based on a speed of the vehicle being greater than a threshold, enabling the traction control system.

12. The method of claim 7, including enabling the traction control system when (a) a indication to enable the traction control system is received in response to a prompt on a human-machine interface to enable the traction control system after the traction control system has been disabled, and (b) after not receiving the indication to enable the traction control system in response to the prompt on the human-machine interface after a period of time, a speed of the vehicle is greater than a threshold.

13. A vehicle comprising:
   a GPS receiver that determines the speed of the vehicle;
   wheel speed sensors on wheels of the vehicle; and
   a traction control module to:
      set a traction control system to an active mode based on measurements from the wheel speed sensors; and
      after the traction control system is set to the active mode, detect that the vehicle is stuck based on speed of the vehicle from the GPS receiver, and disable the traction control system in response to receiving an indication to disable the a traction control system.

* * * * *